A. COLEMAN.
DIFFERENTIAL MECHANISM.
APPLICATION FILED SEPT. 5, 1912.
1,061,450.
Patented May 13, 1913.
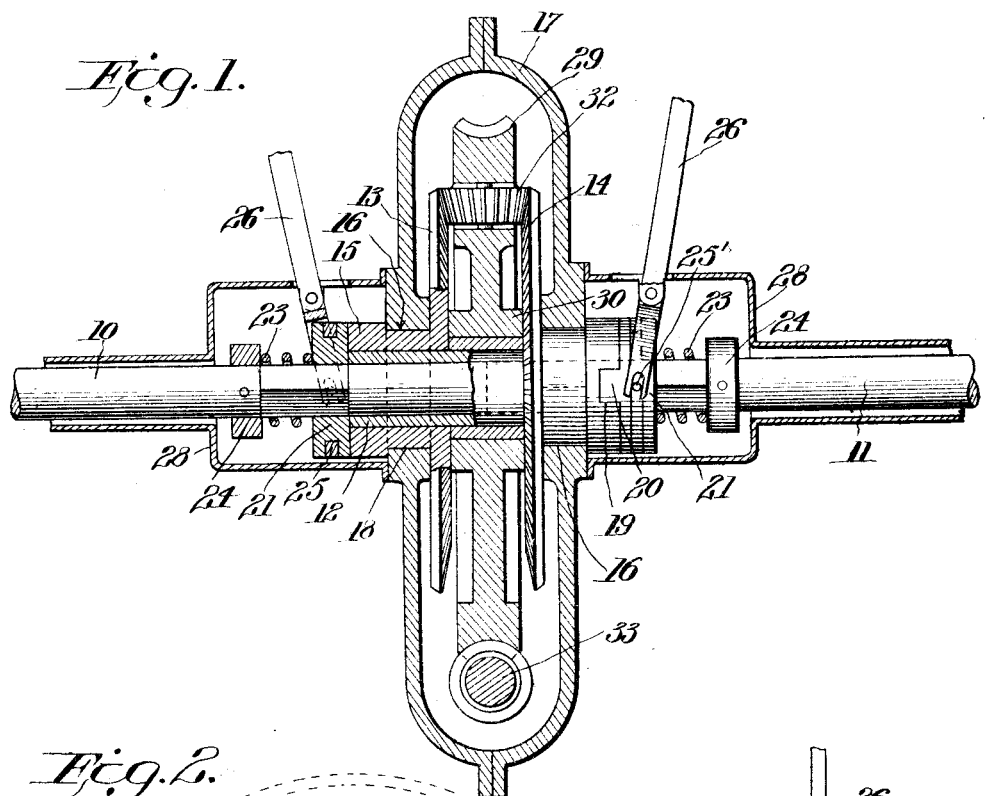
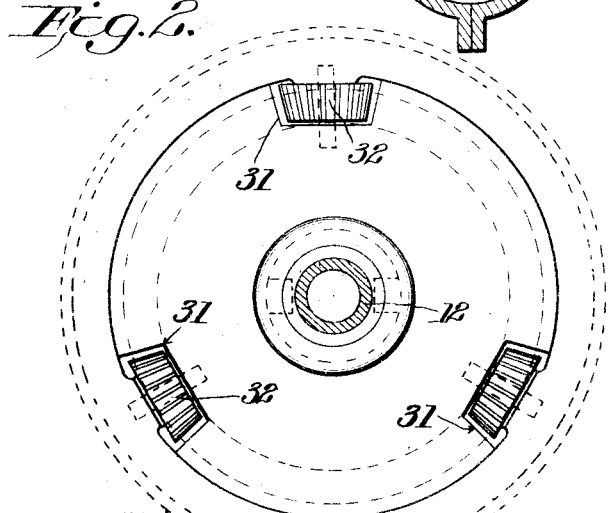
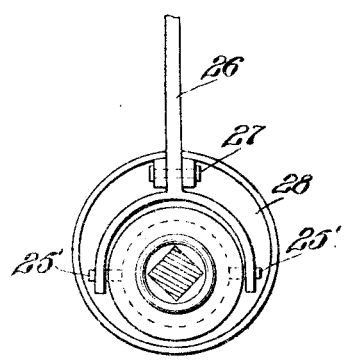
WITNESSES
INVENTOR
Arthur Coleman
Attorney

UNITED STATES PATENT OFFICE.

ARTHUR COLEMAN, OF HIGGINS, TEXAS.

DIFFERENTIAL MECHANISM.

1,061,450. Specification of Letters Patent. Patented May 13, 1913.

Application filed September 5, 1912. Serial No. 718,746.

*To all whom it may concern:*

Be it known that I, ARTHUR COLEMAN, a citizen of the United States, residing at Higgins, in the county of Lipscomb and State of Texas, have invented certain new and useful Improvements in Differential Mechanism, of which the following is a specification.

This invention relates to differential mechanism for automobiles or other vehicles.

One object is to provide a differential mechanism embodying a worm gear connection so associated with other parts of the differential mechanism that coasting of the automobile or other machine is permitted with the worm gear mechanism in mesh.

Another object resides in the provision of a differential mechanism for automobiles or other vehicles embodying a worm gear associated with other parts of the mechanism with the differential mechanism operable for connection and disconnection with the driving shaft of the vehicle under ordinary conditions or to permit coasting without throwing the worm gear mechanism out of mesh.

A still further object resides in the provision of a differential mechanism embodying a beveled gear mechanism and also a worm gear mechanism coöperatively associated with the beveled gear mechanism with clutches arranged at the differential mechanism casing for operation to connect and disconnect the differential mechanism from the driving shaft of the vehicle and for throwing the worm gear mechanism alternately into and out of operative condition.

With the above and other objects in view the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings: Figure 1 is a vertical sectional view of the invention. Fig. 2 is a face view of the worm gear mechanism. Fig. 3 is a sectional view through the squared portion of one of the axle sections illustrating one of the mechanisms for throwing the differential mechanism into and out of operative connection with the axle.

Referring now more particularly to the accompanying drawings the reference characters 10 and 11 indicate the sections of the rear axle of an automobile or other vehicle, the inner ends of the sections abutting in the usual manner for customary purposes, as clearly shown in the drawings, with the abutting ends embraced by a loose sleeve 12.

Loosely mounted on the sleeve 12 are driven beveled gears 13 and 14 of a differential mechanism, having their hubs 15 fitted loosely on said sleeve 12 and projecting through the openings 16 in the sectional casing 17 with the edges of the casing sections where they form said openings 16 preferably thickened and adapted to fit in the grooves 18 of the hubs 15 to lock the gears 13 and 14 against undue lateral play in the casing 17.

The outer end of each hub 15 is provided with a notch 19 adapted to receive the projecting lug 20 of the clutch member 21 sleeved on the squared portions 22 of the axle sections 10 and 11 and which clutch members 21 are arranged to have their lugs 20 normally seated in the notches 19 of the hubs of the gears 13 and 14 through the instrumentality of helical or other springs 23 which bear at one end against the clutch members 21 and at their outer ends against collars 24 fixedly secured in any suitable manner to the axle sections 10 and 11. These clutch members 21 are each provided with a groove in which loosely fits a ring 25 having lugs or pins 25' which are embraced by the forked levers 26 extending through and pivoted at 27 in the casings 28.

Mounted within the casing 17 between the gears 13 and 14 is a worm gear 29. This worm gear 29 has its hub 30 journaled on the aforesaid sleeve 12 and has a plurality of openings 31 in which are journaled in any suitable manner beveled pinions 32 adapted to be constantly in mesh with the aforesaid beveled gears 13 and 14. Driving this worm gear 29 is a worm shaft 33 which remains constantly in mesh with the worm gear 29 and which is adapted to have operative connection with the transmission mechanism of an automobile or other vehicle.

In the use of a worm shaft and worm gear connection in a differential mechanism for automobiles or other vehicles wherein they are in constant mesh provision must be made for coasting purposes, in that this is at present an essential characteristic of vehicles of the character stated. In the present instance, I have the gears 13 and 14 together with the worm 29 loosely mounted on the axle sections 10 and 11 and I provide a suitable clutch mechanism adapted to connect and disconnect the driven gears 13 and 14 to the axle. When the clutch mechanism is in operative positions the gears are clutched to the driving axle and propulsion is obtained in the usual manner. When it is desired to coast, it is simply necessary to shift the clutch members 21 outwardly on the squared portions of the axle sections 10 and 11 to release the lugs 20 of the clutch members 21 from the notches 19 of the hubs of the gears 13 and 14 when, as the result, all of the differential gear mechanism is disconnected from the driving axle of the machine, and notwithstanding the fact that the worm 29 and worm shaft 33 are in mesh, the vehicle may coast down grade without the necessity of throwing the worm gear shaft out of mesh with the worm 29.

From the foregoing it will be seen that I provide a simple, economical, inexpensive and durable differential mechanism for automobile or other vehicles embodying a worm gear connection and yet permitting of coasting with the differential mechanism operable for connection or disconnection with the axle of the vehicle by the instrumentality of clutches closely associated with, or arranged adjacent to, the gear mechanism rather than at the wheels of the machine. In other words, my improved differential mechanism is so constructed and arranged that the differential mechanism and clutch mechanisms are coöperatively connected together with all of the mechanism located midway between the ends of the axle.

What is claimed is:

1. The combination of a casing, an axle composed of sections whose inner ends project into and abut within said casing, each axle having a squared portion adjacent its inner end, a sleeve projecting through said casing and embracing the inner ends of the axle sections between their squared portions to couple the inner ends of the axle sections together, a second sleeve which is mounted within said casing and which embraces said first-mentioned sleeve intermediate the ends of the latter, beveled gears confined within the casing fitted loosely on the first-named sleeve and engaging the ends of the second-mentioned sleeve each of said gears being provided with a hub projecting through said casing, each hub having a notch in its outer end, a worm gear in the casing journaled on the second-mentioned sleeve and provided with openings, beveled gears mounted in the openings of the worm gear and adapted to mesh with the first-named gears, a worm shaft projecting into said casing and having constant mesh therein with said worm gear, clutch members mounted on the squared portions of the axle sections and provided each with a lug adapted to fit in the notch of the corresponding hub of the first-named gears to operatively connect the gears to the axle, collars secured on the axle sections, springs between said collars, and the clutch members to hold them normally in operative relation with the hubs of the first-named gears, levers having connection with said clutch members to shift the latter out of operative relation with the hubs of the first named gears so as to disconnect the gear mechanism from operative connection with the axle to permit coasting with all of said gears constantly in mesh, and casings embracing said collars and said clutch members and into which said operating levers project.

2. The combination of a casing, axle sections whose inner ends project into the casing and abut therein, each axle section having a squared portion adjacent its inner end, a sleeve projecting through said casing and embracing the inner ends of the axle sections between said squared portions to couple the inner ends of the axle sections together, a second sleeve which is mounted within said casing and which embraces said first-mentioned sleeve intermediate the ends of the latter, beveled gears in the casing fitted loosely on the first-named sleeve and engaging the ends of the second-mentioned sleeve each of said gears being provided with a hub projecting through said casing, each hub having a notch in its outer end, a worm gear in the casing journaled on the second-mentioned sleeve and provided with openings, beveled gears mounted in the openings of the worm gear and adapted to mesh constantly with the first-named gears, a worm shaft having constant mesh with said worm gear, clutch members mounted on the squared portions of the axle sections and provided each with a lug adapted to fit normally in the notch of the corresponding hub of the first-named gears to operatively connect the gears to the axle, and levers having connection with said clutch members to shift the latter out of operative relation with the hubs of the first-named gears so as to disconnect the gear mechanism from operative connection with the axle to permit coasting with all of said gears constantly in mesh.

3. The combination of a casing, axle sections whose inner end abut within the casing, beveled gears mounted within the casing, a worm gear mounted within the casing between said beveled gears, beveled pinions carried thereby which mesh with the aforesaid beveled gears, the worm gear and the beveled gears being mounted loosely on said axle sections, a worm shaft projecting into said casing and meshing with the worm gear to operate the latter and drive the beveled gears, the beveled gears having hubs projecting through said casing, and clutch members arranged for sliding movement on the axle sections into direct engagement with said hubs and out of engagement therewith to respectively connect the gears to the axle sections and to disconnect the same therefrom.

4. The combination of a casing, axle sections whose inner ends abut within the casing, a sleeve embracing the abutting ends of the axle sections, beveled gears mounted loosely on said sleeve within said casing and each being provided with a hub which projects through the casing, a sleeve mounted on the first-named sleeve between said beveled gears, a worm gear mounted on the second sleeve between said beveled gears, beveled pinions carried thereby adapted to mesh with the beveled gears to drive the latter, a worm shaft projecting into the casing and having constant mesh with said worm gear to drive the latter, and clutch mechanism arranged adjacent the casing for direct engagement with the hubs of the beveled gears to connect and disconnect the gear mechanism from said axle sections, the worm shaft being in constant mesh with the worm gear whether the clutch members connect or disconnect the gear mechanism and said axle sections.

5. The combination of a casing, axle sections whose ends extend into the casing, a sleeve embracing the inner ends of the axle sections, beveled gears mounted on said sleeve within the casing, a worm gear mounted within the casing between said beveled gears, beveled pinions carried thereby which mesh with the aforesaid beveled gears to drive the latter, a worm shaft projecting into the casing and having constant mesh with said worm gear to drive the latter, and clutch mechanism arranged for direct engagement with said beveled gears to connect and disconnect the gear mechanism from said axle section with the worm shaft in constant mesh with the worm gear whether the clutch mechanisms connect or disconnect the gear mechanism and said axle sections.

In testimony whereof I affix my signature in presence of two witnesses.

ARTHUR COLEMAN.

Witnesses:
   JOHN H. SIGGERS,
   GEO. C. SHOEMAKER.